(12) United States Patent
Clark

(10) Patent No.: US 9,243,749 B2
(45) Date of Patent: Jan. 26, 2016

(54) LUBRICANT INJECTOR

(71) Applicant: Industrial Manufacturing Company International, LLC, Brecksville, OH (US)

(72) Inventor: Peter L. Clark, Kinston, NC (US)

(73) Assignee: Industrial Manufacturing Company International, LLC, Brecksville, OH (US)

( * ) Notice: Subject to any disclaimer, the term of this patent is extended or adjusted under 35 U.S.C. 154(b) by 203 days.

(21) Appl. No.: 14/080,351

(22) Filed: Nov. 14, 2013

(65) Prior Publication Data

US 2015/0129362 A1 May 14, 2015

(51) Int. Cl.
*F16N 25/00* (2006.01)
*F16N 27/00* (2006.01)
*F16N 25/02* (2006.01)

(52) U.S. Cl.
CPC ............ *F16N 25/00* (2013.01); *F16N 25/02* (2013.01); *F16N 27/00* (2013.01)

(58) Field of Classification Search
CPC .......... F16N 25/00; F16N 25/02; F16N 27/00
USPC .............. 184/7.4, 27.1, 29, 32; 417/214, 349, 417/392; 222/249, 335
See application file for complete search history.

(56) References Cited

U.S. PATENT DOCUMENTS

| | | | |
|---|---|---|---|
| 1,942,096 A | 1/1934 | Hallerberg | |
| 2,637,413 A | 5/1953 | Fox et al. | |
| 3,013,633 A | 12/1961 | Rotter | |
| 3,639,082 A * | 2/1972 | Corwin | F04B 7/0007 417/214 |
| 3,664,462 A * | 5/1972 | Smith, Sr. | F16N 13/02 184/29 |
| 3,809,184 A * | 5/1974 | Smith | F16N 27/00 184/7.4 |
| 4,745,990 A | 5/1988 | Saretzky et al. | |
| 5,165,502 A * | 11/1992 | Hirose | F16N 7/385 174/27.1 |
| 5,632,355 A | 5/1997 | Dussault | |
| 6,357,922 B1 | 3/2002 | Harbottle et al. | |
| 6,705,432 B2 | 3/2004 | Conley et al. | |
| 6,808,048 B2 | 10/2004 | Clancy et al. | |
| 6,810,998 B2 | 11/2004 | Conley et al. | |
| 6,986,407 B2 | 1/2006 | Conley et al. | |
| 2007/0122295 A1* | 5/2007 | Divisi | F16N 25/02 417/392 |
| 2013/0092475 A1* | 4/2013 | Arens | F16N 27/00 184/7.4 |

OTHER PUBLICATIONS

European Search Report for corresponding European Application No. EP14192319 dated Mar. 4, 2015.

* cited by examiner

*Primary Examiner* — William E Dondero
*Assistant Examiner* — Robert T Reese
(74) *Attorney, Agent, or Firm* — Caesar Rivise, PC

(57) ABSTRACT

A lubricant injector is provided including a body having a passageway, an inlet, an outlet, and an aperture for lubricant to flow from a measuring chamber into the passageway. A piston is slidable along the passageway. When the piston is in a retracted position, a discharge chamber is present in the passageway between the piston and the outlet. A biasing spring is disposed in the passageway for urging the piston towards the retracted position. The injector has a rest mode, wherein no pressurized lubricant is supplied to the inlet, and the piston is retracted. The injector has a pressurized mode wherein the piston is under pressure and is moved to its extended position to urge lubricant out the outlet. In the rest mode, the spring urges the piston towards its retracted position to create the discharge chamber and to open the aperture between the measuring chamber and the discharge chamber.

17 Claims, 6 Drawing Sheets

LUBRICANT INJECTOR

BACKGROUND OF THE INVENTION

This invention relates generally to lubricating devices and more particularly to injectors for grease or other viscous lubricants.

Various injectors for injecting grease or another viscous lubricant are commercially available from various sources.

The patent literature includes several patents relating to grease injectors. For example, U.S. Pat. No. 6,357,922 (Harbottle et al.) is directed to a lubrication system including injectors. The injectors of the system are shown in FIGS. 2-5. Within an accumulator, a coil spring 109 is used to urge a check valve 108 towards its closed position. U.S. Pat. No. 5,632,355 (Dussault), which is assigned to the same assignee as the subject invention is directed to a grease lubricating system that utilizes injectors. Its injectors 52 are shown in FIGS. 3-7 and accompanying text showing the injectors at various positions in a pump cycle. U.S. Pat. No. 6,705,432 (Conley et al.), U.S. Pat. No. 6,910,998 (Conley et al.) and U.S. Pat. No. 6,986,407 (Conley et al.) are all related applications directed to a lubricant injector having a body containing a reciprocating piston for dispensing lubricant. U.S. Pat. No. 6,808,048 (Clancy et al.) is directed to a modular lubricating system for delivering charges of lubricant and air for aerifying the lubricant to multiple points of lubrication. The system comprises a series of air-operated lubricant injectors. U.S. Pat. No. 4,745,990 (Saretzly et al.) is directed to a lubricant injector having a spring loaded moveable piston actuated with compressed air. A spring loaded feed piston serves to transfer lubricant to the injector tip.

While prior art grease injectors may be suitable for their intended purposes they nevertheless leave something to be desired from various standpoints, e.g., the ability to properly and quickly discharge lubricants at low temperatures, size, weight and simplicity of construction. Thus, a need exists for a lubricant injector that will meet those criteria. The subject invention addresses that need.

All references cited are hereby specifically incorporated by reference herein.

SUMMARY OF THE INVENTION

In an exemplary embodiment of the present invention, a lubricant injector is provided that includes a body, a piston, a biasing spring, and a measuring chamber. The body includes a hollow passageway extending along a longitudinal axis, an inlet in communication with the passageway for receiving a lubricant under pressure into the passageway, an outlet in communication with the passageway for dispensing the lubricant out of the injector, and an aperture through the body providing a path for the lubricant to flow between a measuring chamber disposed outside the passageway and the passageway. The piston has a head and is disposed in the passageway and is slidable along the longitudinal axis of the passageway between a retracted position and an extended position. When the piston is in the retracted position, a discharge chamber is present in the passageway between the piston and the outlet. The discharge chamber is for providing a measured quantity of the lubricant for dispensing out of the outlet. A biasing spring is disposed in the passageway for urging the piston towards the retracted position. The injector has a rest mode, wherein no pressurized lubricant is supplied to the inlet, and wherein the piston is in the retracted position. The injector has a pressurized mode wherein the piston is under pressure and is moved from its retracted position to its extended position to urge lubricant out the outlet, and to provide a path for lubricant to flow from the inlet into the measuring chamber. In the rest mode, the spring urges the piston towards its fully retracted position to create the discharge chamber and to open the aperture between the measuring chamber and the discharge chamber, wherein a path is created for a metered quantity of lubricant to flow from the measuring chamber into the discharge chamber.

The passageway may have a first portion of a first cross-sectional area extending from a first end of the passageway and a second portion of a second cross-sectional area extending from a second end of the passageway. Here, the second cross-sectional area is larger than the first cross-sectional area, the inlet is in communication with the second portion of the passageway, and the outlet in communication with the first portion of the passageway. Here, the piston head is disposed in the first portion of the passageway.

The lubricant injector may also include a measuring chamber assembly that includes the measuring chamber, a measuring chamber body, a measuring chamber piston and a measuring chamber spring. In the pressurized mode, the measuring chamber piston is retracted within the measuring chamber body by the pressurized lubricant to create the measuring chamber. In the rest mode, the measuring chamber piston is biased by the measuring chamber spring to cause the measuring chamber piston to move to its extended position to displace the lubricant in the measuring chamber through the aperture to fill the discharge chamber. The measuring chamber piston may include an indicator pin protruding from the piston, such that, when the injector is in the pressurized mode, the indicator pin extends out through the measuring chamber body to indicate that the measuring chamber is full of lubricant and the injector is in the pressurized mode. The outlet may include a check valve for providing for one way flow of the lubricant out the outlet. A partial load may be present on the biasing spring when the injector is in the rest mode.

In another exemplary embodiment of the present invention, a lubricant injector is provided that includes a body, a piston, a biasing spring and a measuring chamber. The body includes a hollow passageway extending along a longitudinal axis and having a first portion of a first cross-sectional area extending from a first end of the passageway and having a second portion of a second cross-sectional area extending from a second end of the passageway. The second cross-sectional area is larger than the first cross-sectional area. The body includes an inlet in communication with the second portion of the passageway for receiving a lubricant under pressure into the passageway, and an outlet for dispensing lubricant out of the injector. The outlet is in communication with the first portion of the passageway. An aperture through the body provides a path for the lubricant to flow between a measuring chamber located outside of the passageway and the passageway. The piston has a head disposed in the first portion of the passageway and is slidable along the longitudinal axis of the passageway between a retracted position and an extended position. When the piston is in the retracted position, a discharge chamber is present in the passageway between the piston and the outlet. The discharge chamber provides for a measured quantity of lubricant for dispensing. The biasing spring is disposed in the second portion of the passageway for urging the piston towards the retracted position. The injector has a rest mode, wherein no pressurized lubricant is supplied to the inlet, wherein the piston is in the retracted position, and wherein the aperture is opened between the measuring chamber and the discharge chamber of the passageway. The injector has a pressurized mode wherein the piston is under pressure and is moved from its retracted position to its extended position to urge lubricant out the outlet, and subsequently provides a path for lubricant to flow from the inlet, through the second portion of the passageway, through an annular recess on the piston, through the aperture, and into the measuring chamber. In the rest mode, the spring urges the piston towards its fully retracted position to create the discharge chamber and to open the aperture between the measuring chamber and the discharge chamber. The metered quantity of lubricant flows from the measuring chamber, through the aperture in the body of the injector and into the discharge chamber.

The injector may have a measuring chamber assembly including the measuring chamber, a measuring chamber body, a measuring chamber piston and a measuring chamber spring. In the pressurized mode, the measuring chamber piston is retracted to create the measuring chamber, wherein, in the rest mode, the measuring chamber piston is biased by the measuring chamber spring to cause the measuring chamber piston to move to its extended position to displace lubricant in the measuring chamber through the aperture to fill the discharge chamber. The measuring chamber piston may include an indicator pin protruding from the piston, such that, when the injector is in the pressurized mode, the indicator pin extends out through the measuring chamber body to indicate that the measuring chamber is full of lubricant and the injector is in the pressurized mode. The outlet may include a check valve for providing for one way flow of the lubricant out the outlet. A partial load may be present on the biasing spring when the injector is in the rest mode.

In a more detailed exemplary embodiment of the present invention, a lubricant injector is provided including a body, a piston, a biasing spring and a measuring chamber. The body includes a hollow passageway having a first end and a second end, where the passageway extends along a longitudinal axis. The passageway has a first portion of a first cross-sectional area extending from the first end to an intermediate point of the passageway. The passageway has a second portion of a second cross-sectional area extending from the intermediate point of the passageway to the second end of the passageway. The second cross-sectional area is larger than the first cross-sectional area. The body also includes an inlet in communication with the second portion of the passageway for receiving a lubricant under pressure into the passageway. The body further includes an outlet for dispensing the lubricant, disposed in the first end of the passageway and in communication with the first portion of the passageway. Finally, the body includes an aperture through the body, adjacent to the first portion of the passageway which provides for a path for the lubricant to flow between a measuring chamber disposed outside the passageway and a discharge chamber of the passageway.

The piston has a head disposed in the first portion of the passageway and is slidable along the longitudinal axis of the passageway between a retracted position and an extended position. The piston head has a piston face having a cross-sectional area sized to allow the piston to slide in the passageway while providing for substantially no lubricant to pass. The piston also includes a piston shaft having a cross-sectional area that is less than the cross-sectional area of the second portion of the passageway. The piston shaft extends from the piston head into the second portion of the passageway. When the piston is in the retracted position, a discharge chamber is present in the passageway between the piston face and the outlet. The discharge chamber is for providing a measured quantity of the lubricant for dispensing. The biasing spring is located in the second portion of the passageway between the second end of the passageway and the intermediate point. The biasing spring is for urging the piston towards the retracted position. The injector has a rest mode for urging a measured quantity of lubricant from the measuring chamber into the discharge chamber. The injector also has a pressurized mode for dispensing the lubricant in the discharge chamber through the outlet, and for receiving pressurized lubricant through the inlet. Here, the piston is moved from the retracted position to the extended position. When the piston is in a fully extended position, a lubricant path is provided from the inlet, through the second portion of the passageway and through an annular recess located in a space between the piston shaft and the first portion of the passageway, through the aperture in the body of the injector and into the measuring chamber, In the rest mode, the spring urges the piston back to its retracted position, wherein a path for lubricant to flow opens from the measuring chamber, through the aperture in the body of the injector and into the discharge chamber.

The injector may further include a measuring chamber assembly that includes the measuring chamber, a measuring chamber body, a measuring chamber piston and a measuring chamber spring. In the pressurized mode, the measuring chamber piston is moved to a retracted position within the measuring chamber body to create the measuring chamber. In the rest mode, the measuring chamber piston is biased by the measuring chamber spring to an extended position and the measuring chamber piston displaces the lubricant in the measuring chamber through the aperture to fill the discharge chamber.

The measuring chamber piston may include an indicator pin protruding from the piston, such that, when the injector is in the pressurized mode, the indicator pin extends out through the measuring chamber body to indicate that the measuring chamber is full of lubricant and the injector is in the pressurized mode. The outlet may include a check valve for providing for one way flow of the lubricant out the outlet.

Finally, the biasing spring may be a helical spring having coils and an open central portion, wherein the piston shaft is disposed in the open central portion of the helical spring. A partial load may be present on the biasing spring when the injector is in the rest mode.

DETAILED DESCRIPTION OF THE PREFERRED EMBODIMENT

Figure 1:
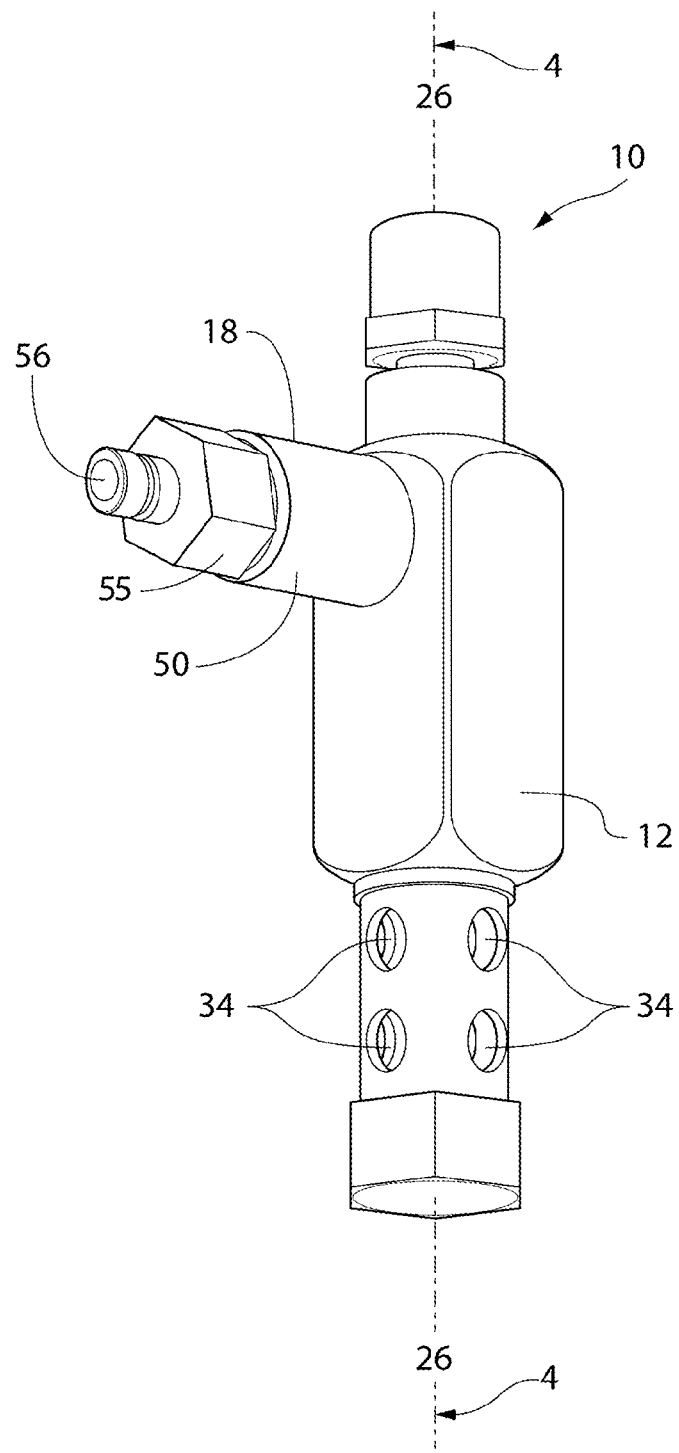
FIG. 1 is an isometric view of a lubricant injector in accordance with an exemplary embodiment of the present invention.
Figure 2:
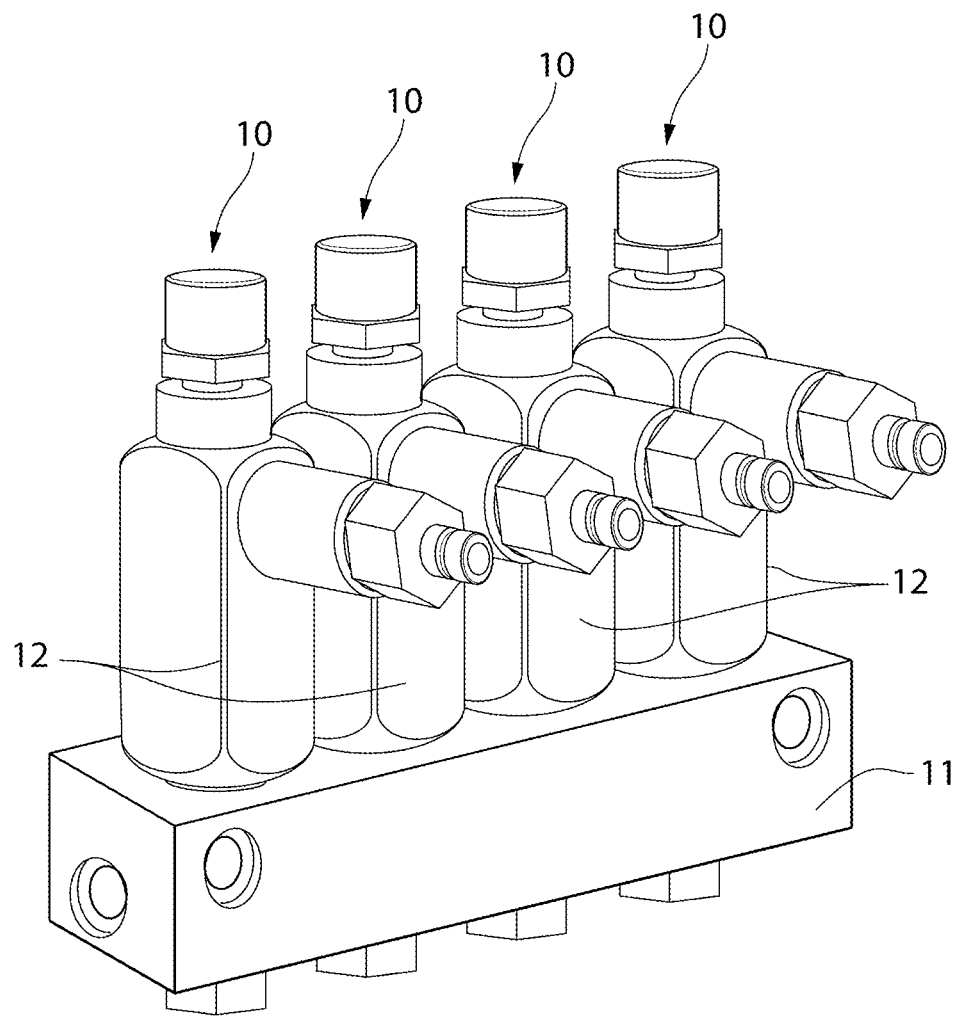
FIG. 2 is an isometric view of an exemplary manifold made up of plural lubricant injectors like that of FIG. 1.

Referring now to the various figures of the drawing wherein like reference numbers refer to like parts throughout the several views, there is shown in FIGS. 1-5 a lubricant injector 10 constructed in accordance with one exemplary embodiment of the present invention. The lubricant injectors of this invention are preferably designed for use in single line, high pressure, automatic grease systems, where they deliver precise volumes of lubricant at predetermined intervals, but can be used in other applications if appropriate. The injectors are preferably mounted in a manifold 11 in close proximity to the points of lubrication as shown in FIG. 2. The injectors can be made to provide a wide selection of discharge rates, and are preferably formed with a corrosion resistant finish to make them ideally suited for mobile use, use in wind, and use in a broad selection of general industrial applications.

Figure 3:
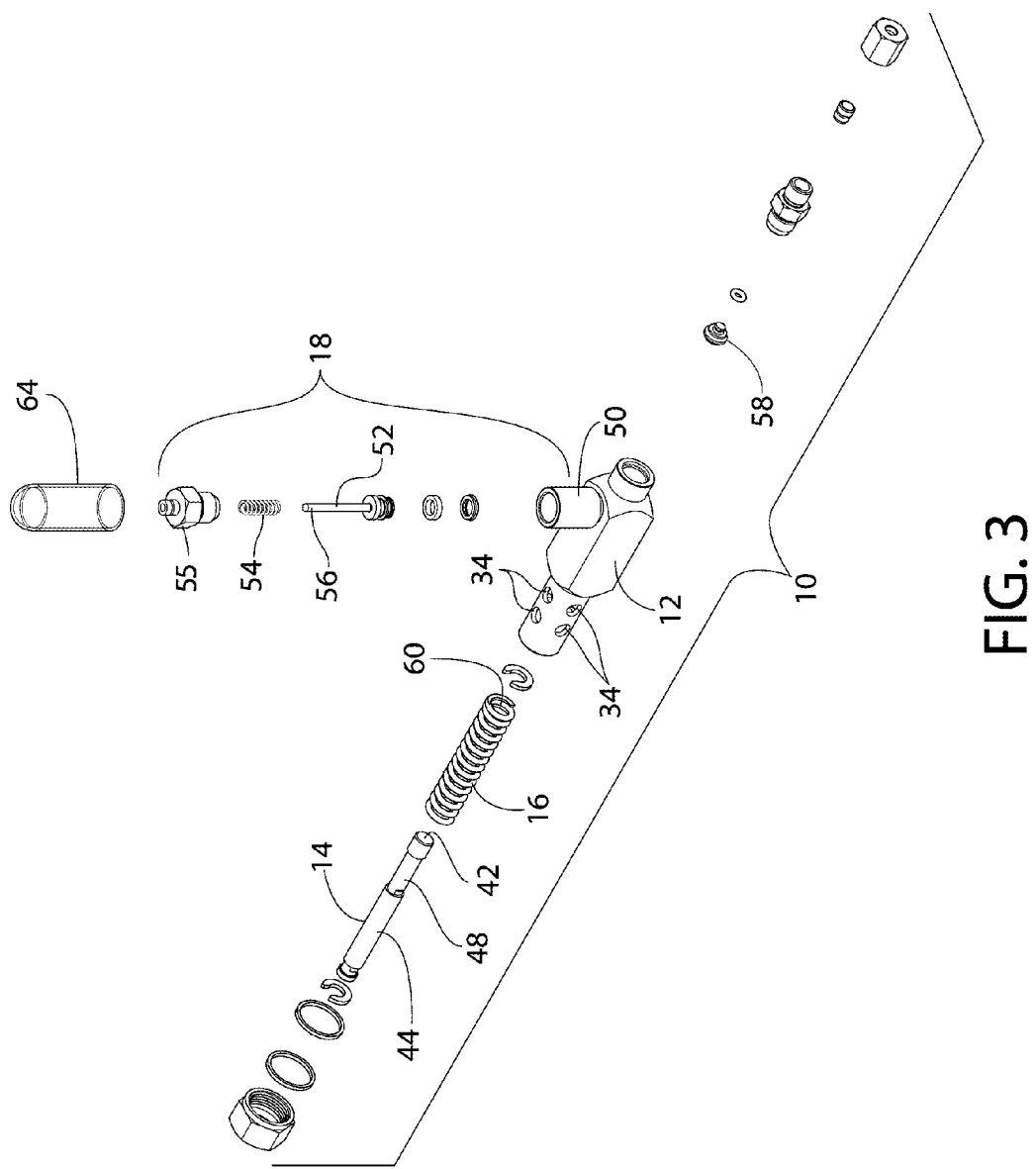
FIG. 3 is an exploded isometric view of the lubricant injector of FIG. 1.
Figure 4:
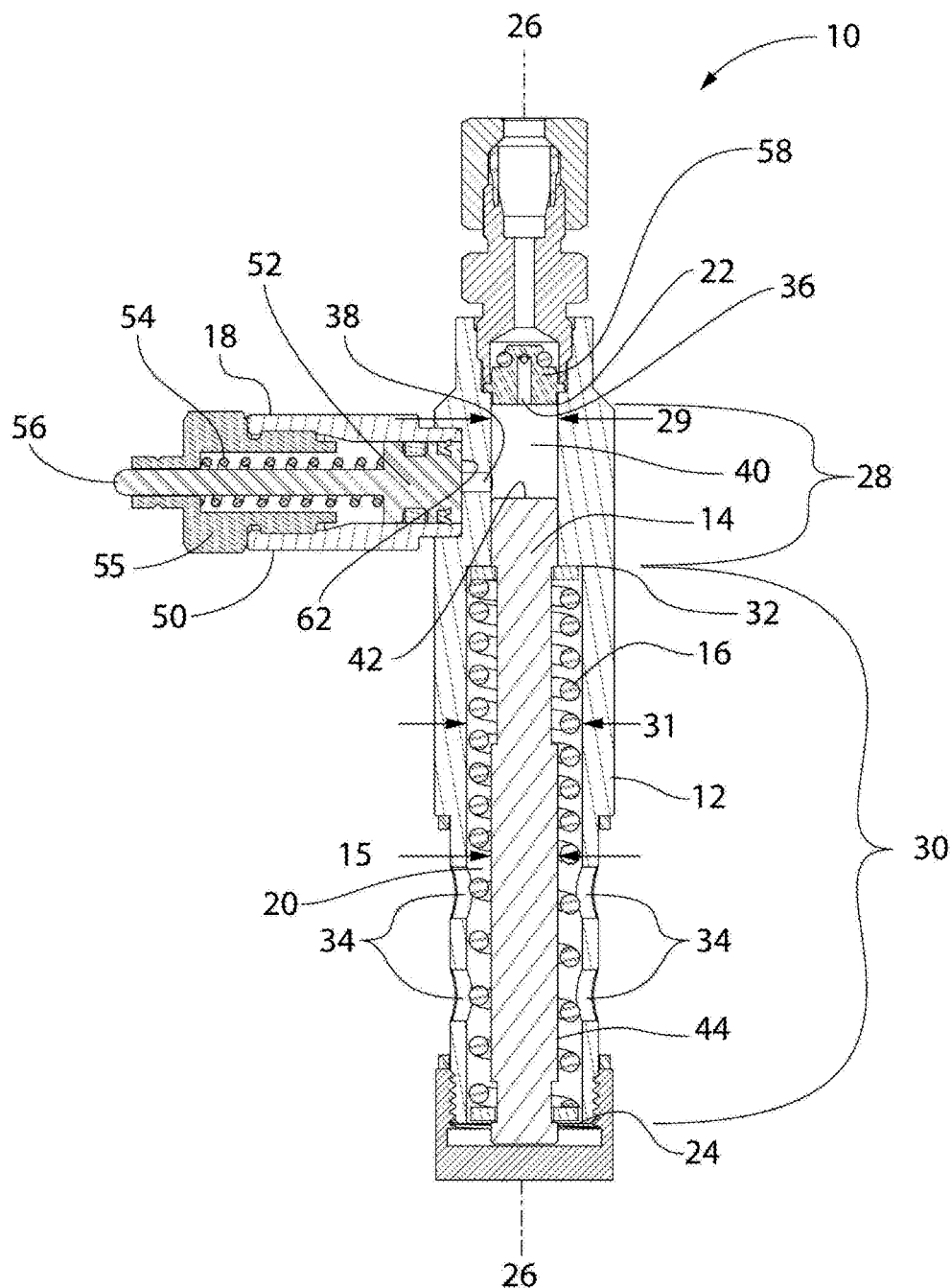
FIG. 4 is an enlarged cross-sectional view of the lubricant injector of FIG. 1, taken substantially along lines 4-4 of FIG. 1, showing the lubricant injector in its "rest" mode.
Figure 5:
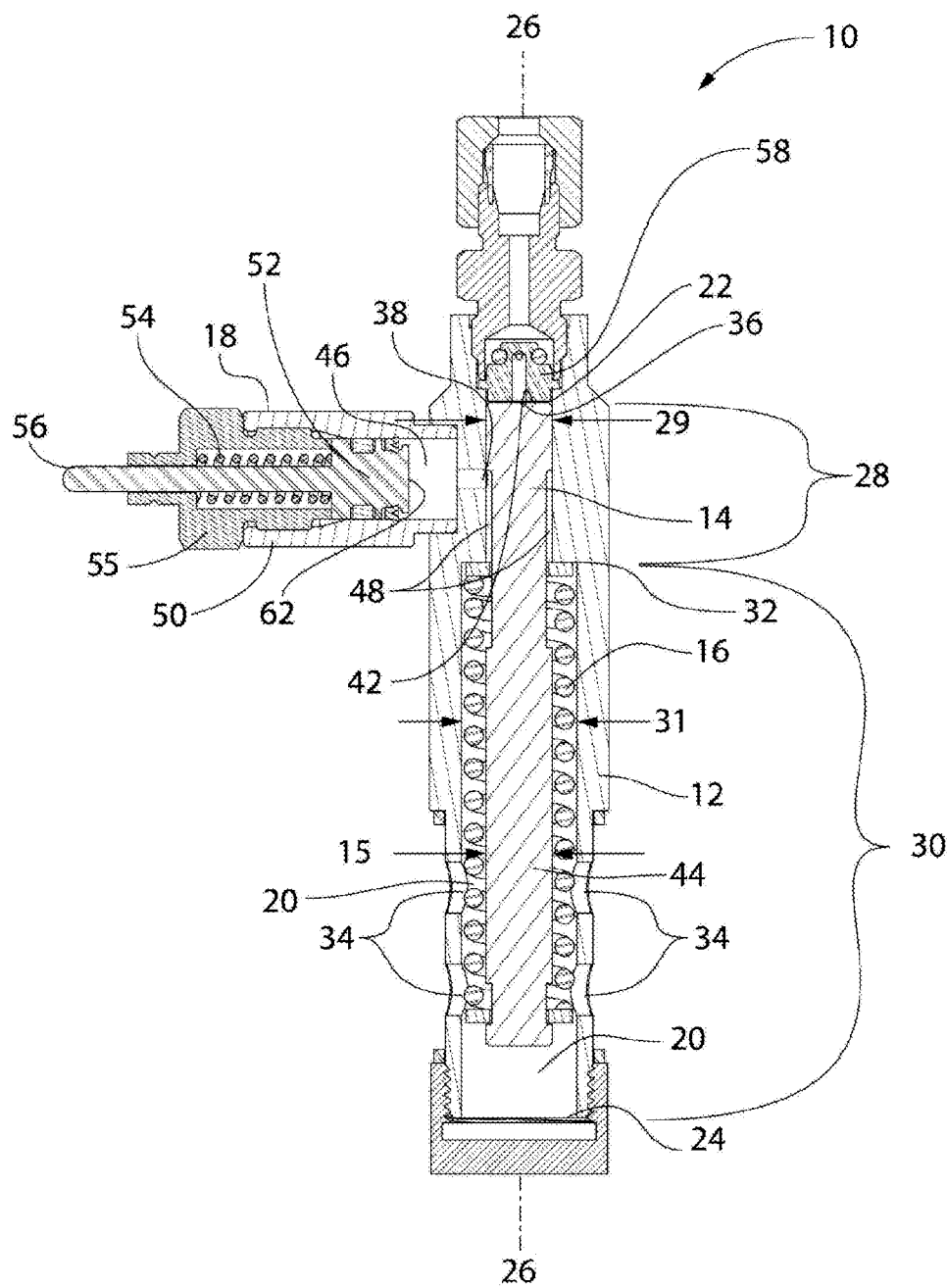
FIG. 5 is an enlarged cross-sectional view of the lubricant injector of FIG. 1, taken substantially along lines 4-4 of FIG. 1, showing the lubricant injector in pressurized mode.

As shown best in exploded view of FIG. 3 and the cross-sectional views of FIGS. 4 and 5, the exemplary lubricant injector 10 includes a body 12, a piston 14, a biasing spring 16, and a measuring chamber assembly 18.

As seen in the cross-sectional views of FIGS. 4 and 5, the body 12 includes a hollow passageway 20 having a first end 22 and a second end 24, and extends along a longitudinal axis 26. The passageway 20 has a first portion 28 of a first cross-sectional area (perpendicular to the longitudinal axis) extending from the first end 22 to an intermediate point 32. Additionally, the passageway 20 has a second portion 30 of a second cross-sectional area (perpendicular to the longitudinal axis) extending from the intermediate point 32 to the second end 24 of the passageway. The second cross-sectional area (that of the second portion 30 of the passageway 20) is larger than the first cross-sectional area (that of the first portion 28 of the passageway 20). In the exemplary embodiment shown, the first and second cross-sectional areas are circular and are designated by diameters 29 and 31, respectively.

An inlet 34 to the passageway 20 provides for pressurized lubricant to enter the second portion 30 of the passageway. The inlet 34 may include one or more holes through the body 12 as shown in FIGS. 1 and 3-5. An outlet 36 for dispensing the lubricant is disposed adjacent to the first end 22 of the passageway, and is in communication with the first portion 28 of the passageway 20.

An aperture 38 through the body 12 and adjacent to the first portion 28 of the passageway 20 provides a path for the lubricant to flow between a measuring chamber 46 (see FIG. 5) and a discharge chamber 40 (see FIG. 4). The discharge chamber 40 is only present when the injector 10 is in a rest mode as shown in FIG. 4, as will be explained below.

Figure 6:
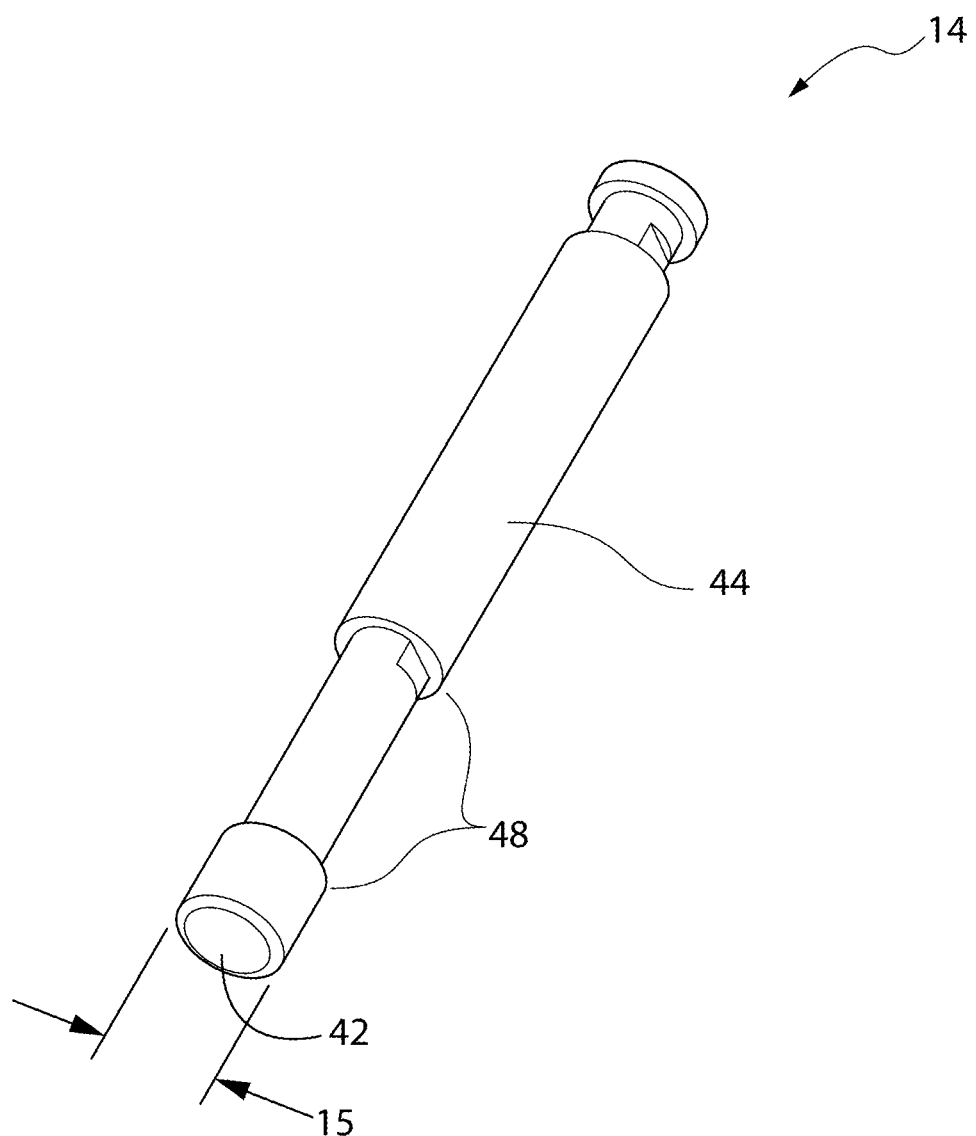
FIG. 6 is an isometric view of an exemplary piston of the lubricant injector of FIG. 1.

The piston 14 (see FIG. 6) is disposed in the passageway 20 and is slidable along the longitudinal axis 26 of the passageway 20 between a retracted position (see FIG. 4) and an extended position (see FIG. 5). The piston 14 has a piston face 42 that has a cross-sectional area sized to allow the piston 14 to slide in the passageway 20 while providing for substantially no lubricant to pass. The piston 14 also includes a piston shaft 44 having a cross-sectional area (based on diameter 15 as shown in FIGS. 4 and 5) that is less than the cross-sectional area (based on diameter 31) of the second portion 30 of the passageway 20 (the cross sectional area of the second portion 28 of the passageway 20 is perpendicular to the longitudinal axis 26 of the passageway, as shown).

When the piston 14 is in the retracted position, as shown in FIG. 4, the discharge chamber 40 is present in the section of the passageway 20 between the piston face 42 and the outlet 36. The discharge chamber 40 is for providing a measured quantity of the lubricant for dispensing out through the outlet 36.

The biasing spring 16 is disposed in the second portion 30 of the passageway 20 between the second end 24 of the passageway 20 and the intermediate point 32. The biasing spring 16 urges the 14 piston towards the retracted position (see FIG. 4). Preferably, the biasing spring 16 is pre-loaded, that is, the spring is partially compressed in the assembled state of the injector. Preferably, a measuring chamber assembly 18 is disposed on the body 12 and includes the measuring chamber 46 (see FIG. 5) that is in communication with the discharge chamber 40 via aperture 38.

In order to dispense lubricant through the outlet 36 in measured quantities, the injector 10 has a rest mode (see FIG. 4) and a pressurized mode (see FIG. 5). In the rest mode, a measured quantity of lubricant is urged from the measuring chamber 46, through the aperture 38, and into the discharge chamber 40 (compare FIG. 4 to FIG. 5) and is described in further detail below. In the pressurized mode (see FIG. 5), the lubricant in the discharge chamber 40 is dispensed from the discharge chamber 40 through the outlet 36. Here, the lubricant under pressure (from, for example, an external pressurized reservoir; not shown) is delivered to the inlet 34. The lubricant under pressure is received through the inlet 34 and causes the piston 14 to move from the retracted position (see FIG. 4) to the extended position (see FIG. 5), against the force of the spring 16. When the piston 14 is moved to the fully extended position, a path is created such that lubricant flows from the inlet 34 through the second portion 30 of the passageway 20 and through an annular recess 48 in the space between the piston shaft 44 and the first portion 28 of the passageway 20, through the aperture 38 in the body 12 of the injector 10 and into the measuring chamber 46 such that the measuring chamber 46 is filled with a metered quantity of lubricant. More specifically, the aperture 38 aligns with the annular recess 48 of the piston 14 such that a path for lubricant to flow is opened from the inlet 34 in the body 12, passing the coils of the spring 16, and through to the measuring chamber 46. See FIG. 5. As the piston 14 moves from the fully retracted position (FIG. 4) to the fully extended position (FIG. 5), lubricant in the discharge chamber 40 is urged by the piston 14 and dispensed through the outlet 36. After the metered quantity of lubricant is dispensed from the discharge chamber 40, the pressure of the lubricant is relieved such that the piston 14 travels back under the force of the spring 16 to its retracted position.

In the rest mode, as shown in FIG. 4, as stated above, the spring 16 urges the piston 14 back to its retracted position which then provides a path for a metered quantity of lubricant to flow from the measuring chamber 46, through the aperture 38 in the body 12 of the injector 10 and into the discharge chamber 40.

Preferably, the spring 16 is a helical spring having coils and an open or hollow central portion 60. The piston shaft 44 is disposed in the open central portion 60 of the helical spring 16.

The measuring chamber assembly 18 includes a measuring chamber body 50, a measuring chamber piston 52 a measuring chamber spring 54, a cap 55, and the measuring chamber 46. In particular, in the pressurized mode (see FIG. 5), the lubricant displaces the measuring chamber piston 52 over the force of the spring 52 within the measuring chamber body 50 to create the measuring chamber 46. The measuring chamber piston 52 is biased by the spring 54 to cause the piston 52 to displace the lubricant in the measuring chamber 46 through the aperture 38 to fill the discharge chamber 40 (see FIG. 4). This may only occur when the injector 10 is in its rest mode (see FIG. 4) because, when the injector 10 is in its pressurized mode, the discharge chamber 40 no longer exists due to the extended position of the piston 14.

Optionally, the measuring chamber piston 52 may include an indicator pin 56 protruding from the piston 52 (preferably opposite the measuring chamber piston face 62) and extending through the cap 55, such that, when the injector 10 is in the rest mode, the indicator pin 56 extends out through the measuring chamber body 50 to indicate that the measuring chamber 46 contains a full metered quantity of lubricant. A transparent dome 64 may be mounted on the cap 55 to protect the indicator pin 56. See FIG. 3.

The outlet 36 may include a check valve 58 at the outlet for providing one way flow of the lubricant only in an outward direction out the outlet 36.

When in the rest mode, as described above, the injector 10 is ready for its next discharge cycle and is again ready to receive pressurized lubricant through the inlet 34.

Due to use of the biasing spring 16 in the present invention, preferably in a pre-loaded condition, a higher reset pressure is required (i.e., the pressure of the pressurized lubricant entering the inlet 34). This higher reset pressure allows the injector 10 it to operate at lower temperatures, provides for a smaller overall envelope size of the injector and may provide for a reduced re-set time. This allows the injector 10 to be used in tighter spaces where mounting space is at a premium. Additionally, the present design offers reduced manufacturing costs due to its simplicity and smaller size.

As should be appreciated by those skilled in the art from the foregoing, lubricant injectors constructed in accordance with this invention exhibit the following advantageous features: (1) they provide precise, quick and dependable operation, without the need for special tools; pre-loading the spring may reduce the amount of time necessary for the injector to re-set after discharge and prior to delivering a subsequent volume of lubricant; (2) they include a visual indicator pin for inspection and troubleshooting, (3) they provide positive displacement output, (4) they are simple in construction so that they are easy to understand, install and service, (5) the design of the piston and spring assembly enables the injector to be quite compact, resulting in less weight per assembly, reduced production costs and a smaller overall size than prior art injectors, (6) they can be provided in single and double row configurations in a manifold and can be mounted in any orientation, (7) they can make use of a single supply line, thereby lowering installation cost, and (8) they are corrosion resistant making them particularly suitable for harsh environments.

Without further elaboration the foregoing will so fully illustrate my invention that others may, by applying current or future knowledge, adopt the same for use under various conditions of service.

I claim:

1. A lubricant injector, comprising:
  (a) a body, comprising:
    (1) a hollow passageway extending along a longitudinal axis,
    (2) an inlet in communication with the passageway for receiving a lubricant under pressure into the passageway;
    (3) an outlet in communication with the passageway for dispensing the lubricant out of the injector,
    (4) an aperture through the body providing a path for the lubricant to flow between a measuring chamber disposed outside the passageway and the passageway;
  (b) a piston having a head, the piston disposed in the passageway and slidable along the longitudinal axis of the passageway between a retracted position and an extended position,
  (c) wherein, when the piston is in the retracted position, a discharge chamber is present in the passageway between the piston and the outlet, the discharge chamber for providing a measured quantity of the lubricant for dispensing;
  (d) a biasing spring disposed in the passageway for urging the piston towards the retracted position;
  (e) the injector having a rest mode, wherein no pressurized lubricant is supplied to the inlet, and wherein the piston is in the retracted position;
  (f) the injector having a pressurized mode wherein the piston is under pressure and is moved from its retracted position to its extended position to urge lubricant out the outlet, and to provide a path for lubricant to flow from the inlet into the measuring chamber; and
  (g) wherein, in the rest mode, the spring urges the piston towards its fully retracted position to create the discharge chamber and to open the aperture between the measuring chamber and the discharge chamber, wherein a path is created for a metered quantity of lubricant to flow from the measuring chamber into the discharge chamber.

2. The lubricant injector of claim 1, wherein the passageway has a first portion of a first cross-sectional area extending from a first end of the passageway and has a second portion of a second cross-sectional area extending from a second end of the passageway, the second cross-sectional area being larger than the first cross-sectional area, wherein the inlet is in communication with the second portion of the passageway, and outlet in communication with the first portion of the passageway, and wherein the piston head is disposed in the first portion of the passageway.

3. The lubricant injector of claim 1, further including a measuring chamber assembly that includes the measuring chamber, a measuring chamber body, a measuring chamber piston and a measuring chamber spring, wherein, in the pressurized mode, the measuring chamber piston is retracted within the measuring chamber body by the pressurized lubricant to create the measuring chamber, wherein, in the rest mode, the measuring chamber piston is biased by the measuring chamber spring to cause the measuring chamber piston to move to its extended position to displace lubricant in the measuring chamber through the aperture to fill the discharge chamber.

4. The lubricant injector of claim 3, wherein the measuring chamber piston includes an indicator pin protruding from the piston, such that, when the injector is in the pressurized mode, the indicator pin extends out through the measuring chamber body to indicate that the measuring chamber is full of lubricant and the injector is in the pressurized mode.

5. The lubricant injector of claim 1, wherein the outlet includes a check valve for providing for one way flow of the lubricant out the outlet.

6. The lubricant injector of claim 1, wherein a partial load is present on the biasing spring when the injector is in the rest mode.

7. A lubricant injector, comprising:
  (a) a body comprising:
    (1) a hollow passageway extending along a longitudinal axis, the passageway having a first portion of a first cross-sectional area extending from a first end of the passageway and having a second portion of a second cross-sectional area extending from a second end of the passageway, the second cross-sectional area being larger than the first cross-sectional area;
    (2) an inlet in communication with the second portion of the passageway for receiving a lubricant under pressure into the passageway;
    (3) an outlet for dispensing the lubricant out of the injector, the outlet in communication with the first portion of the passageway; and (4) an aperture through the body providing a path for the lubricant to flow between a measuring chamber disposed outside the passageway and the passageway;

(b) a piston having a head disposed in the first portion of the passageway and slidable along the longitudinal axis of the passageway between a retracted position and an extended position, (c) wherein, when the piston is in the retracted position, a discharge chamber is present in the passageway between the piston and the outlet, the discharge chamber for providing a measured quantity of the lubricant for dispensing;

(d) a biasing spring disposed in the second portion of the passageway for urging the piston towards the retracted position;

(e) the injector having a rest mode, wherein no pressurized lubricant is supplied to the inlet, wherein the piston is in the retracted position, and the aperture is opened between the measuring chamber and the discharge chamber;

(f) the injector having a pressurized mode wherein the piston is under pressure and is moved from its retracted position to its extended position to urge lubricant out the outlet, and subsequently to provide a path for lubricant to flow from the inlet, through the second portion of the passageway, through an annular recess on the piston, through the aperture, and into the measuring chamber; and (g) wherein, in the rest mode, the spring urges the piston towards its fully retracted position to create the discharge chamber and to open the aperture between the measuring chamber and the discharge chamber, wherein a path for lubricant to flow is opened from the measuring chamber through the aperture in the body of the injector, and into the discharge chamber.

8. The lubricant injector of claim 7, further including a measuring chamber assembly that includes the measuring chamber, a measuring chamber body, a measuring chamber piston and a measuring chamber spring, wherein, in the pressurized mode, the measuring chamber piston is retracted within the measuring chamber body to create the measuring chamber, wherein, in the rest mode, the measuring chamber piston is biased by the measuring chamber spring to cause the measuring chamber piston to move to its extended position to displace the lubricant in the measuring chamber through the aperture to fill the discharge chamber.

9. The lubricant injector of claim 8, wherein the measuring chamber piston includes an indicator pin protruding from the piston, such that, when the injector is in the pressurized mode, the indicator pin extends out through the measuring chamber body to indicate that the measuring chamber is full of lubricant and the injector is in the pressurized mode.

10. The lubricant injector of claim 7, wherein the outlet includes a check valve for providing for one way flow of the lubricant out the outlet.

11. The lubricant injector of claim 7, wherein a partial load is present on the biasing spring when the injector is in the rest mode.

12. A lubricant injector, comprising:

(a) a body comprising:

(1) a hollow passageway having a first end and a second end, the passageway extending along a longitudinal axis, the passageway having a first portion of a first cross-sectional area extending from the first end to an intermediate point of the passageway, the passageway having a second portion of a second cross-sectional area extending from the intermediate point of the passageway to the second end of the passageway, the second cross-sectional area being larger than the first cross-sectional area;

(2) an inlet in communication with the second portion of the passageway, the inlet for receiving a lubricant under pressure into the passageway;

(3) an outlet for dispensing the lubricant, the outlet disposed in the first end of the passageway and in communication with the first portion of the passageway; and (4) an aperture through the body, adjacent to the first portion of the passageway, providing a path for the lubricant to flow between a measuring chamber disposed outside the passageway and a discharge chamber of the passageway;

(b) a piston having a head disposed in the first portion of the passageway and slidable along the longitudinal axis of the passageway between a retracted position and an extended position, the piston head having a piston face having a cross-sectional area sized to allow the piston to slide in the passageway while providing for substantially no lubricant to pass, the piston also including a piston shaft having a cross-sectional area that is less than the cross-sectional area of the second portion of the passageway, the piston shaft extending from the piston head and into the second portion of the passageway;

(c) wherein, when the piston is in the retracted position, a discharge chamber is present in the passageway between the piston face and the outlet, the discharge chamber for providing a measured quantity of the lubricant for dispensing;

(d) a biasing spring disposed in the second portion of the passageway between the second end of the passageway and the intermediate point, the biasing spring for urging the piston towards the retracted position;

(e) the injector having a rest mode for urging a measured quantity of lubricant from the measuring chamber into the discharge chamber;

(f) the injector having a pressurized mode for dispensing the lubricant in the discharge chamber through the outlet, and for receiving pressurized lubricant through the inlet, wherein the piston is moved from the retracted position to the extended position, wherein when the piston is in a fully extended position, a lubricant path is provided from the inlet, through the second portion of the passageway and through an annular recess located in a space between the piston shaft and the first portion of the passageway, through the aperture in the body of the injector and into the measuring chamber; and (g) wherein, in the rest mode, the spring urges the piston back to its retracted position, wherein a path for lubricant to flow opens from the measuring chamber, through the aperture in the body of the injector and into the discharge chamber.

13. The lubricant injector of claim 12, further including a measuring chamber assembly that includes the measuring chamber, a measuring chamber body, a measuring chamber piston and a measuring chamber spring, wherein in the pressurized mode, the measuring chamber piston is moved to a retracted position within the measuring chamber body to create the measuring chamber, wherein in the rest mode, the measuring chamber piston is biased by the measuring chamber spring to an extended position wherein the measuring chamber piston displaces the lubricant in the measuring chamber through the aperture to fill the discharge chamber.

14. The lubricant injector of claim 13, wherein the measuring chamber piston includes an indicator pin protruding from the piston, such that, when the injector is in the pressurized mode, the indicator pin extends out through the measuring chamber body to indicate that the measuring chamber is full of lubricant and the injector is in the pressurized mode.

15. The lubricant injector of claim 12, wherein the outlet includes a check valve for providing for one way flow of the lubricant out the outlet.

16. The lubricant injector of claim 12, wherein the spring is a helical spring having coils and an open central portion, wherein the piston shaft is disposed in the open central portion of the helical spring.

17. The lubricant injector of claim 12, wherein a partial load is present on the biasing spring when the injector is in the rest mode.

* * * * *